United States Patent [19]
Grover et al.

[11] Patent Number: 5,850,505
[45] Date of Patent: Dec. 15, 1998

[54] METHOD FOR PRECONFIGURING A NETWORK TO WITHSTAND ANTICIPATED FAILURES

[75] Inventors: Wayne D. Grover; Michael H. MacGregor, both of Edmonton, Canada

[73] Assignee: Telecommunications Research Laboratories, Edmonton, Canada

[21] Appl. No.: 551,709

[22] Filed: Nov. 1, 1995

[51] Int. Cl.⁶ .............................. G06F 11/20; H04J 3/14
[52] U.S. Cl. .................. 395/182.02; 370/227; 370/228; 379/221; 340/827
[58] Field of Search ........................ 395/182.02, 182.01, 395/181; 370/16, 216, 219, 220, 227, 228, 248, 353; 379/221, 273; 371/20.1, 20.2; 340/825.01, 827; 364/269.2, 285.1

[56] References Cited

U.S. PATENT DOCUMENTS

| | | | |
|---|---|---|---|
| 4,956,835 | 9/1990 | Grover ...................................... | 370/16 |
| 4,959,854 | 9/1990 | Cave et al. .............................. | 379/112 |
| 4,993,015 | 2/1991 | Fite, Jr. ........................... | 395/182.02 X |
| 5,065,399 | 11/1991 | Hasegawa ........................... | 395/182.02 |
| 5,093,824 | 3/1992 | Coan ........................................ | 370/16 |
| 5,113,398 | 5/1992 | Howes ................................. | 395/182.02 |
| 5,146,452 | 9/1992 | Pekarske .................................... | 370/16 |
| 5,222,128 | 6/1993 | Daly et al. ............................... | 379/221 |
| 5,239,537 | 8/1993 | Sakauchi ........................ | 395/182.02 X |
| 5,371,744 | 12/1994 | Campbell ........................... | 395/182.02 |
| 5,435,003 | 7/1995 | Chng ................................... | 395/182.02 |
| 5,444,693 | 8/1995 | Arslan .................................... | 370/16 |
| 5,463,615 | 10/1995 | Steinhorn ....................... | 395/182.02 X |
| 5,548,639 | 8/1996 | Ogura et al. ............................ | 379/221 |
| 5,550,805 | 8/1996 | Takatori ................................ | 370/16.1 |
| 5,590,119 | 12/1996 | Moran et al. .......................... | 370/225 |
| 5,646,936 | 7/1997 | Shah et al. .............................. | 370/228 |
| 5,657,320 | 8/1997 | Russ ....................................... | 370/217 |

OTHER PUBLICATIONS

Potential for spare capacity preconnection to reduce cross-connection workloads in mesh–restorable networks, W.D. Grover, M.H. MacGregor, Electronics Letters, Feb. 3, 1994, vol. 30., No. 3, pp. 194–195.

An Optimal Spare–Capacity Assignment Model for Survivable Networks with Hop Limits, Meir Herzberg and Stephen J. Bye, Telecom Australia Research Laboratories, 6 pages, undated.

CPLEX Optimization, Inc., CPLEX Web Info, 2 pages, Mar. 23, 1995.

*Primary Examiner*—Dieu-Minh Le
*Attorney, Agent, or Firm*—Anthony R. Lambert

[57] ABSTRACT

A method for restoring traffic in a network. The network includes plural distinct nodes interconnected by plural distinct spans, each span having working links and spare links. Each node has a digital cross-connect switch for making and breaking connections between adjacent spans forming span pairs at a node. Step 1: For each of at least two possible span failures, (a) find the number of restoration routes available in case of the occurrence of each span failure, (b) determine the resources used by each restoration route, and (c) determine the amount of flow to be restored for each span failure. Step 2: find, in a computer, the amount of flow $f^p$ to be restored along each restoration route that minimizes total unrestored flow for all possible span failures identified in step 1. Step 3: form connections at each digital cross-connect switch in the network along each restoration route before occurrence of one of the possible span failures identified in step 1 to permit the amount of flow $f^p$ determined in step 2 to be carried by each respective restoration route upon the occurrence of one of the possible span failures identified in step 1.

12 Claims, 7 Drawing Sheets

- 4 / 8 links found preconnected
- remaining 4 links can be restored dynamically by SHN

METHOD FOR PRECONFIGURING A NETWORK TO WITHSTAND ANTICIPATED FAILURES

FIELD OF THE INVENTION

This invention relates to methods for restoring networks of spans, for example telecommunications networks, upon the occurrence of a failure of one of the spans of the network.

BACKGROUND OF THE INVENTION

Methods for the restoration of digital transport networks have been studied for several years. Some researchers have concluded that distributed real-time protocols may operate too slowly to meet operational objectives, such as the 2 second call-dropping threshold in voice networks. This problem can be overcome by preparing the network for anticipated failures by optimally preconfiguring resources which will be used to react to the failure. This places the network into a state of "best readiness" to face a given set of anticipated failures. See W. D. Grover and M. H. MacGregor, "Potential for spare capacity preconnection to reduce crossconnection workloads in mesh-restorable networks", Electronics Letters, Vol. 30, No. 3, pp. 194–195, Feb. 3, 1994, and M. Herzberg and S. J. Bye, "An optimal spare-capacity assignment model for survivable networks with hop limits", Proceedings of IEEE Globecom '94, Vol. 3, pp. 1601–1606, IEEE, 1994.

The tremendous interest in real-time network restoration over the last few years is evidence both of the importance and difficulty of this problem. Evidence has been mounting that it may not always be possible to meet operational requirements with real-time techniques. The suggested cures have ranged from high speed, parallel computing architectures for digital crossconnect machines to simplified network architectures where restoration can be made to occur more quickly in real-time. The proposal of Grover and MacGregor suggests anticipating failures, and preconfiguring the network to handle them so that real-time computation or reaction delay (one or both) is not required except at the endpoints of the failure. Thus, preconfiguration methods apply where computing a reaction or implementing it (or both) is/are too lengthy a process.

Various heuristic methods can be proposed to solve the problem of preconfiguring a network, given the anticipated failures and the resources available for reacting to them. However, it is not obvious how to achieve an optimal state of preconfiguration, largely because of the combinatorial complexity of the problem and the difficulty of finding an appropriate analytical notation. Grover and MacGregor establish the maximum potential for preconfiguration in a number of example networks, by arriving at a single scalar value there called an upper bound on network readiness. On average, 79% of the crosspoints required for span restoration of a mesh-restorable network were found available in the networks considered. This leaves open the question of how to find a detailed preconfiguration of the network to achieve some portion of this potential. The particular question left open by Grover and MacGregor was how to devise a means of coordinating the total quantities of span-to-span interconnection so that individual link crossconnections would be most coherently related to those at other nodes. The goal was stated as one of forming the maximum number of fully preconnected end-to-end paths for the average restoration case. The method disclosed here provides a method of achieving that goal for the specific case of anticipating all possible span failures in a mesh-restorable network, as well as being more generally applicable to a variety of failure modes and network types.

SUMMARY OF THE INVENTION

There is therefore provided, in accordance with one aspect of the invention, a method for restoring traffic in a network in which the network is pre-configured for span restoration. The network includes plural distinct nodes interconnected by plural distinct spans, each span having working links and spare links. Each node has a digital cross-connect switch for making and breaking connections between links in adjacent spans forming paths or path segments (span pairs) through nodes. In a broad characterization of the method, there are three steps.

Step 1: For each of at least two possible span failures, (a) find the number of restoration routes available in case of the occurrence of each span failure, (b) determine the resources used by each restoration route, and (c) determine the amount of flow to be restored for each span failure.

Step 2: find, in a computer, the amount of flow $f^p$ to be restored along each restoration route that minimizes total unrestored flow for all possible span failures identified in step 1.

Step 3: form connections at each digital cross-connect switch in the network along each restoration route before occurrence of one of the possible span failures identified in step 1 to permit the amount of flow $f^p$ determined in step 2 to be carried by each respective restoration route upon the occurrence of one of the possible span failures identified in step 1.

These and other aspects of the invention will be described in more detailed below and claimed in the claims that follow.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Figure 1:
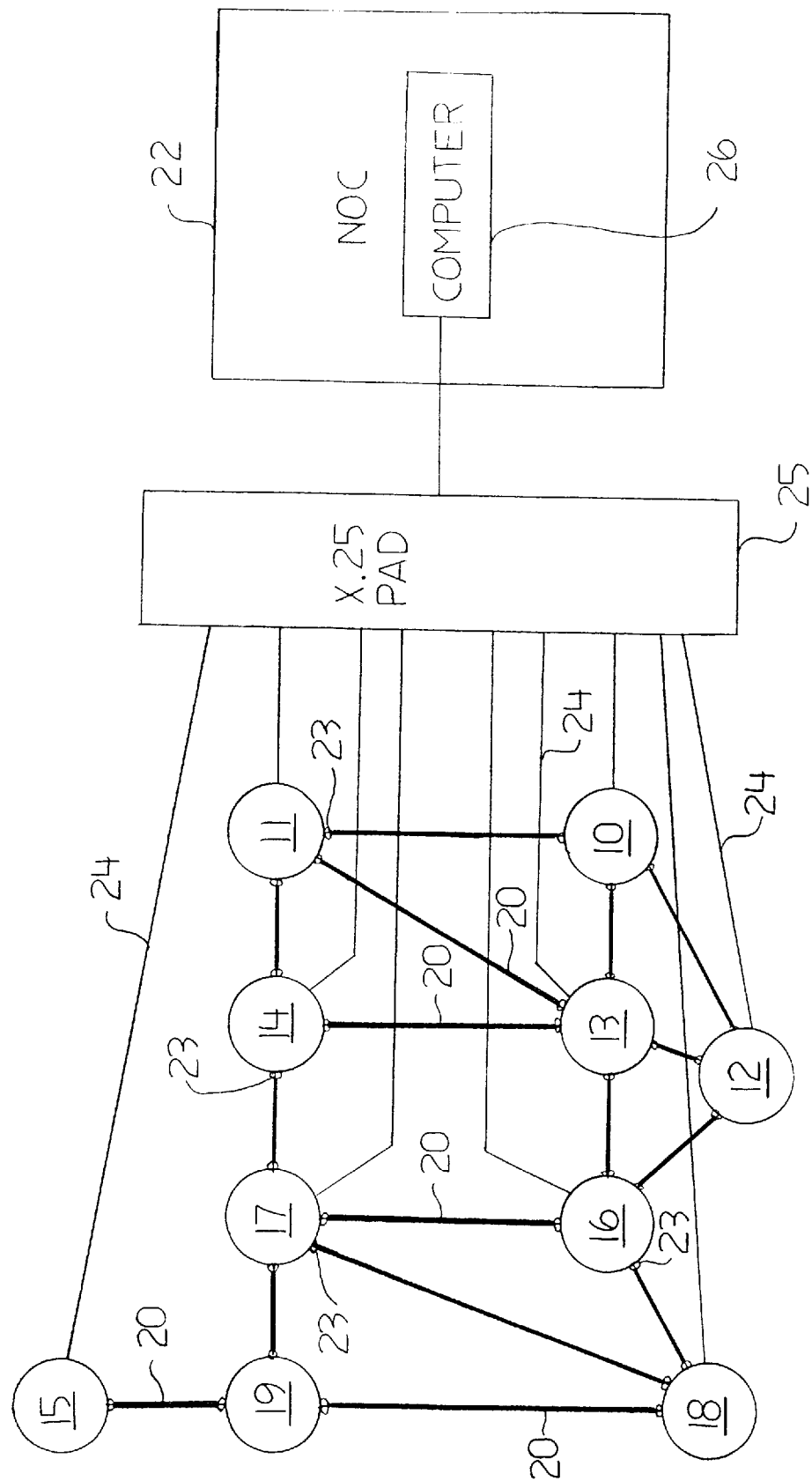
FIG. 1 is a schematic showing nodes of a network with a network control overlay for use in carrying out the method of the invention.

Referring to FIG. 1, there is shown a network formed of plural distinct nodes 10, 11, 12, 13, 14, 15, 16, 17, 18 and 19 interconnected by plural distinct spans, each labelled 20. A specific span may be labelled according to the nodes it interconnects, so that the span connecting nodes 10 and 12 would be referred to as span 10–12 as in FIG. 1, or it may be labelled directly, as in FIGS. 2A–2D or FIG. 3. Each span 20 is a telecommunications facility link having working links and spare links, and may comprise for example OC-3 links. Each node 10, 11, 12, 13, 14, 15, 16, 17, 18 and 19 incorporates, and may be considered to consist essentially of, a conventional digital cross-connect switch for making and breaking connections between links in adjacent spans 20 at the node. The links in spans 20 connect to the nodes 10–19 through fiber optic terminals, for example AT&T FT Series G, for electrical/optic conversion of the signals. Exemplary digital cross-connect switches are the AT&T DACS IV-2000, Alcatel RDX-33 and the Tellabs Titan Model 5533. Adjacent spans, for example spans 10–12 and 12–16 form a span pair. A network operations center 22, for example an AT&T Transport and Maintenance System, controls the operation of the digital cross-connect switches 10, 11, 12, 13, 14 15, 16, 17, 18 and 19 via a control overlay of for example X.25 communications links 24. The network operations center 24 includes a computer 26 that carries out the computations in the operation of the method of the invention and that instructs the digital cross-connect switches 10, 11, 12, 13, 14, 15, 16, 17, 18 and 19 to make and break connections between links in adjacent spans 20. The computer may be, for example, a UNIX work station that may be connected directly to the digital cross-connect switches via the X.25 communications links and through an X.25 packet assembler-disassembler.

For practical implementation of the method of the invention, the network, the set of anticipated failures, and the intended means of reacting to those failures can be represented in the computer 26 as an objective function, a set of constraints which relate preconfiguration options to available network resources, and a set of constants which specify whether a given restoration reaction occupies a particular resource in the case of a particular failure. Such a formulation may be called a tableau to determine the preferred preconfiguration of network resources to respond to one or more anticipated failures, or more simply a "preconfiguration tableau".

Figure 1A:
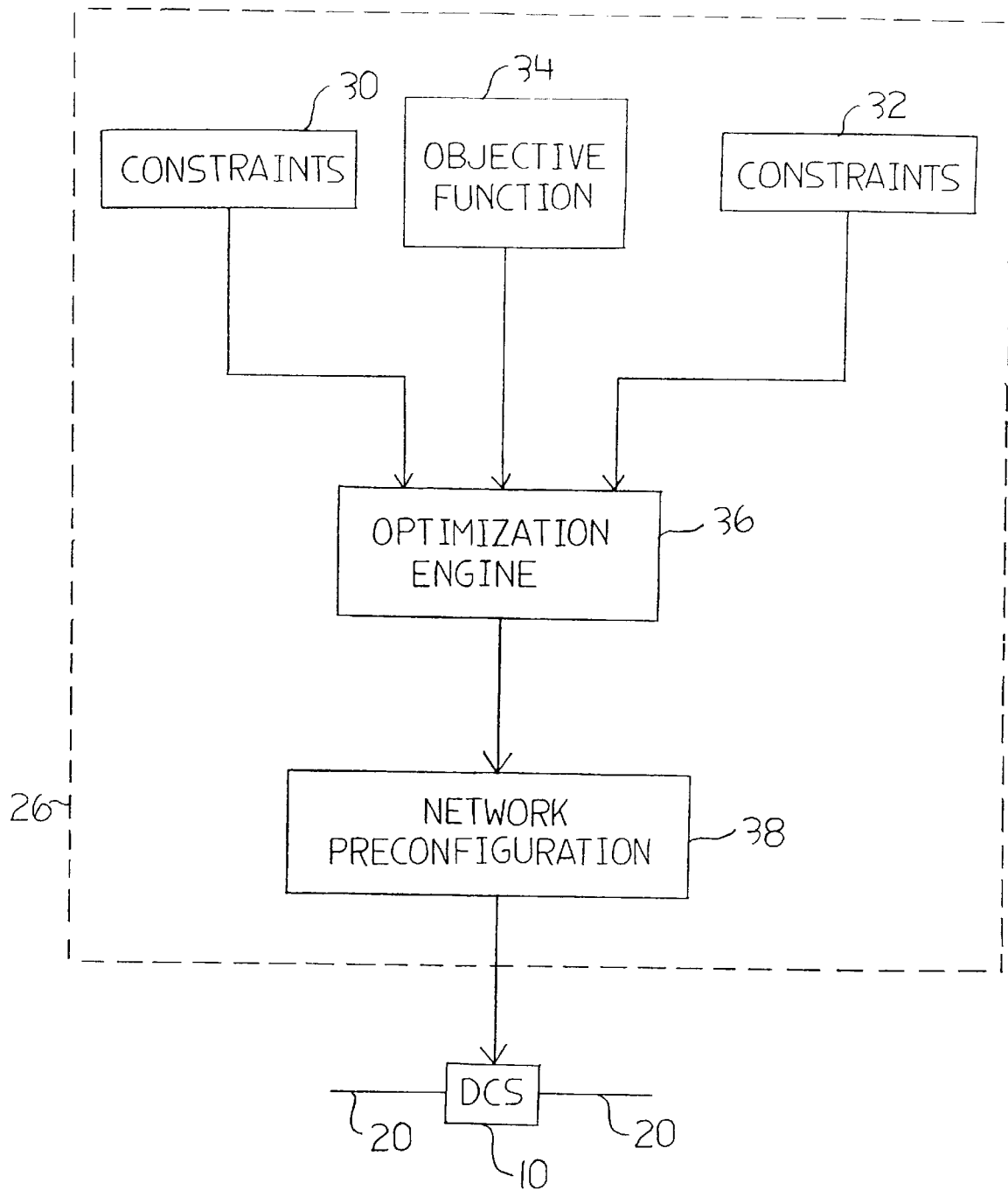
FIG. 1A is a schematic showing the method steps as they are carried out by the computer at an operations center.

The set of constants to be input to the computer 26 are stored in the computer 26 in a memory 30 as illustrated in FIG. 1A, which may be any of various kinds of computer readable memory. The constants may be entered via a conventional text editor or may be supplied through an additional program that generates the constants. The set of constraints to be input to the computer 26 are stored in the computer 26 in a memory 32, which may also be any of various kinds of memory. The set of constraints may likewise be entered to computer 26 through a conventional text editor or another program. Format of the input constants and constraints is determined by the optimization engine. The objective function is also stored in memory 34. Memory 30, 32 and 34 may all be part of a larger memory.

Once a preconfiguration tableau is constructed within computer 26, it can be passed to any of a number of preexisting software packages (optimization engines) for solving optimization problems. The software package is loaded into the computer 26 where it configures the computer 26 as an optimization engine 36. The constants, objective function and constraint sets are then provided to the optimization engine 36, which calculates the optimized preconfiguration of resources for the network in compliance with the preconfiguration tableau. This preconfiguration of resources may be stored in a memory 38 or output directly to the network.

The output of the optimization engine is used to instruct the digital cross-connect switches 10, 11, 12, 13, 14, 15, 16, 17, 18 and 19 and put the network into a state of preferred readiness. An exemplary optimization engine that may be used in the implementation of the invention is the CPLEX Linear Optimization Base System available from CPLEX Optimization, Inc., Suite 279, 930 Tahoe Blvd, Bldg 802, Incline Village, Nev. 89451. The optimization engine may be linear or non-linear according to whether the objective function is linear or non-linear in the solution variables.

The objective function reflects operational priorities. For example, in the case of a transport network, the preferred objective is to preconfigure the network to minimize the sum of unrestored flow over all possible span failures, considered one at a time. This objective function can be written as:

$$\min \sum_{i=1}^{N_f} w_i u_i$$

where $u_i$ is the unrestored flow for the ith failure given the preconfigured state of the network, $w_i$ is a weight which can be used to reflect the probability or cost of a given failure, and $N_f$ is the number of failures being considered. The weights $w_i$ are selected by the operator, retrieved from memory, or may be input from another computer program.

In a voice network, the flow in the network is usually discussed in terms of carried traffic. The objective function for a voice network can be constructed in equivalent form to the above described objective function, in which it is sought to minimize lost traffic defined in terms of Erlang 'B' losses or to minimize blocking. In a transport network, the objective function may be constructed to minimize the maximum flow remaining lost after restoration. In a data network, the objective function can be set up in form to minimize throughput loss or delay. The form of each of these objective functions is known in the art and need not be further described here.

Figure 2A:
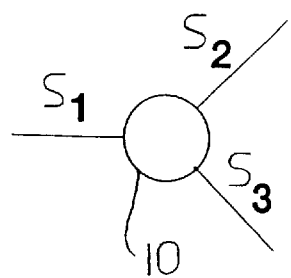
FIG. 2A illustrates a node with three spans connected to it.
Figure 2B:
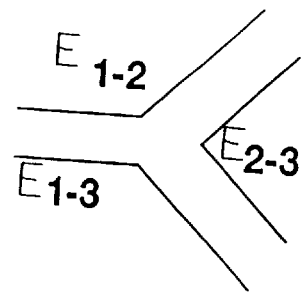
FIG. 2B illustrates how the node of FIG. 2A in the original network is transformed for the calculation of the preconfiguration tableau.
Figure 2C:
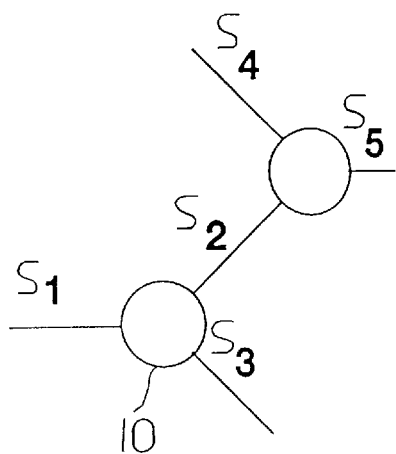
FIG. 2C illustrates a pair of interconnected nodes, each with three spans connected to it.
Figure 2D:
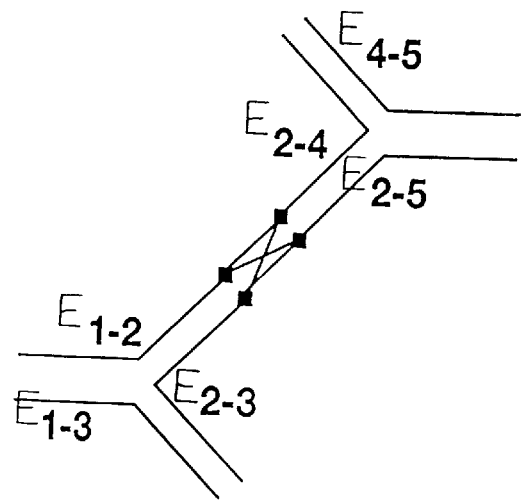
FIG. 2D illustrates how the nodes of FIG. 2C in the original network are transformed using a virtual cross-bar for the calculation of the preconfiguration tableau.

The network is transformed, within the computer 26, into an equivalent representation as illustrated in FIGS. 2A, 2B, 2C and 2D. Each possible span pair, for example spans $S_1$ and $S_2$ at a node 10, becomes an edge $E_{1-2}$ in the transformed network as shown in FIG. 2B. The transformed edges of neighbouring nodes, as for example nodes 10 and 12 shown in FIG. 2C are represented as having edges joined with a full virtual crossbar 30 as shown in FIG. 2D. The computer 26 thus constructs a model of the network formed of cross-connected edges (span pairs).

The constraint sets specify the set of failures being considered (that is, which spans are being considered), the network resources available for responding to those failures (the spare capacities of the spans that might be used as restoration paths), and the choices available in responding to each failure, such as a variety of routing choices.

The constraints are defined in terms of flow, which in the context of a communications network represents the movement of signal units, but it could equally well represent the transport of commodities through a set of pipelines, or the carriage of goods over highways in trucks. The endpoints of span failure are sources and sinks of flow (e.g. Sender and Chooser in a distributed restoration algorithm), while flow is assumed to be conserved at intermediate nodes of the transformed network (e.g. Tandem nodes).

The constraint sets make use of both variables and constants. The variables are values manipulated by the optimization engine in order to arrive at a feasible, optimal solution. Each variable represents a state of a network element, and the values that the variable can take are the possible states of that element. For example, a variable might represent the number of connections being made at a node. The constants are fixed values which describe the features of the original network, and the preconfiguration options for each failure.

The constants in the constraint equations include the number s of spans in the original network, the restoration capacity $R_i$ of each span, the number $N_f$ of failures being considered, the amount of flow to be restored for each failure (the number of working links on a span whose failure is being considered), the number P of restoration routes for each failure, and the resources (spans) used by each restoration route. The resources are specified by the notation $\delta_j^p$, which takes the value 1 when a span j is in a given restoration route p, and zero otherwise. $\delta_j^p$ is thus a matrix which reflects routes in the network. This matrix may be rather empty, containing many zeros, so that in describing the route it may sometimes be simpler to specify the sequence of spans in a route.

All of these constants are inputs to the method. That is, the constants are input to the computer 26 when the computer 26 implements the optimization engine. The constants may be outputs from other software programs. For example, the restoration capacity of a given span may fluctuate, and a program may be used that keeps track of the state of the spans in the network. The output of this program will then specify one set of constants for the optimization engine. As another example, the set of constants which specifies the resources used to restore a particular failure can be quite large, depending on the size of the network. In general, if the location of the nodes and spans of a network are known, the preferred or shortest set of routes can be identified by well-known procedures. In a given case, since the number of restoration routes in a large network can be extremely large, various limits may be placed on the available restoration routes such as by number of spans (for example no more than, say, 10 spans in a route) or by distance along the route (for example the route may not be longer than 20,000 km) or by a combination of upper limits.

The preconfiguration state of the network is specified by the variables which give the amount of flow $f^p$ on each restoration path. The values of $f^p$ are output from the optimization engine and may be automatically used to establish the cross-connections at each digital cross-connect switch along the specified restoration routes.

For minimizing unrestored flow in a transport network, the objective function is first defined. It is desirable to keep the objective function linear in its variables, as this allows the use of linear programming tools in solving the problem as for example the CPLEX system. Such tools are widely available and can be very efficient.

The network is transformed into an equivalent representation as described in FIGS. 2A, 2B, 2C and 2D. The transformation and the constraint set generation are carried out within a software program in computer 26.

Seven constraint sets may be used in the tableau. $C_{i,j}$ is the number of connections formed between spare links in spans i and j of the original network. Any other number of working links may also be corrected through this node for spans i, j but they are not of concern. $C_{i,j}$ is thus the number of restoration connections for i and j, and is the capacity of edge i–j in the transformed network. For uniqueness, i<j. Restoration readiness connections can be made only between spans that meet at a common node (pairs of adjacent spans). The sum of the restoration connections involving a span is bounded by the restoration capacity of the span:

$$\left( \sum_{j=1}^{s} C_{i,j} \leq R_i \right) \forall i = 1, \ldots, s \quad \text{Constraint set 1}$$

$f^p$ is the restoration flow along the p'th restoration route through the preconfigured connections. The amount of preconnected flow on a spare connection is bounded by the capacity assigned to that spare connection:

$$\left( \sum_{p=1}^{P} \delta_j^p \delta_k^p f^p \leq C_{j,k} \right) \forall j, k = 1, \ldots, s \quad \text{Constraint set 2}$$

where $\delta_j^p$ is zero unless $f^p$ crosses span j, in which case it is 1.

$C_{k,m}^{i,j}$ is the number of pre-configuration connections to be made at a virtual crossbar between edges i–j and k–m. For uniqueness, i<j, k<m, and i≦k. $C_{k,m}^{i,j}$ is the number of cross-over connections between i–j and k–m and specify how much of the restoration capacity in i–j connections is allocated on the next hop to become k–m connections. (Thus, one of i=k, i=m, j=k, or j=m must be true.) The amount of preconnected restoration flow on a cross-over connection is bounded by the amount of capacity assigned to that cross-over connection:

$$\left( \sum_{p=1}^{P} \delta_j^p \delta_k^p \delta_m^p f^p \leq C_{k,m}^{j,k} \right) \forall j, k, m = 1, \ldots, s \quad \text{Constraint set 3}$$

The sum of cross-over connections to or from a given spare connection is bounded by the size of the spare connection:

$$\left( \sum_{k=1}^{s} \sum_{m=1}^{s} C_{k,m}^{i,j} \leq C_{i,j} \right) \forall i, j = 1, \ldots, s \quad \text{Constraint set 4}$$

$u^i$ represents the flow left unrestored by the preconfiguration plan for failure i, $d_i$ represents the amount of flow to be restored after failure i, and $r_i$ represents the amount of flow restorable in excess of the demand (super-restorable flow). Then:

$$\left( u_i + \sum_{p=1}^{P} \zeta_i^p f^p = d_i + r_i \right) \forall i = 1, \ldots, N_f \quad \text{Constraint set 5}$$

where the $\zeta_i^p$ are 0/1 according to whether $f^p$ can be used for restoring failure i: In the case of span restoration, $\zeta_i^p$ is 1 for any flow whose route contains the end-nodes of the failed span, and that route does not contain the failed span, and P is the number of restoration routes being considered over all failures. It is preferable to treat the $\zeta_i^p$ as input constants and write them into the constraint set, thus removing all variables for which the multiplier is zero.

The amount of unrestored flow is bounded by the total demand:

Constraint set 6 $(u_i < d_i) \forall i = 1, \ldots s$

The number of demand units in excess of what is required for restoration of a span, $r_i$, and the flow on a route, $f^p$, are non-negative. All variables may be required to be non-negative integers, which complicates the solution and may require a very large amount of computation.

If the cross-checking provided by the counts of spare connections between spans and the counts of crossover connections between pairs of spans is not required, then constraint sets 2 and 4 can be omitted, and constraint set 1 is written in terms of flow:

$$\left(\sum_{p=1}^{P} \delta_i^p f^p \leq R_i\right) \forall i = 1, \ldots, s \quad \text{Constraint set 8}$$

Once the tableau has been written, it must be submitted to an optimization engine to find an optimal solution. The format of the tableau is specified by the particular optimization engine used. The information specified above, applied to a particular problem, such as one of the problems described below, is sufficient to instruct the CPLEX optimization engine. The output from the engine will include the value of the objective function, and values for all the variables. The preconfiguration state of the network is derived from the values of the $f^p$ by mapping these flows onto the network, and preconfiguring resources (e.g. by operating the digital cross-connect switches at the nodes traversed by each restoration route) to support the given amount of flow. The state of the network can be double-checked by testing whether the numbers of spare connections and cross-over connections match those in the output from the optimization engine.

Figure 3:
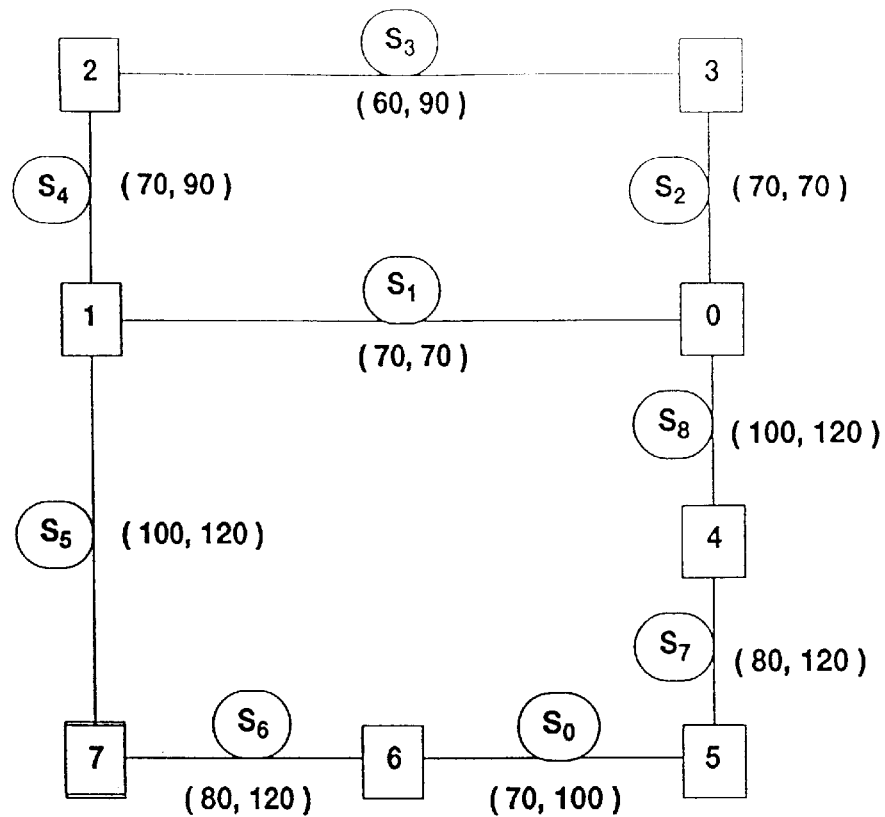
FIG. 3 is a diagram which presents an example network for application of the method of the invention.

The example network and results shown in FIG. 3 briefly illustrate the method. There are eight boxes numbered 0 through 7 representing eight network nodes, and nine circles numbered $S_0$ to $S_8$ representing the spans in the network. The numbers in parentheses beside each span represent the working and spare capacity of each span. A preconfiguration plan has been developed to anticipate failures on spans $S_0$, $S_1$ and $S_2$. In each case, the failure of a span results in the loss of 70 working links. In general, the spans could have different working capacities. The network transformation results in 12 variables representing spare connections, and 16 variables representing crossover connections. After defining the objective function, the constraints in the manner disclosed in constraint sets 1–7 and solving the tableau, the results shown below are obtained, where the $p^j$ have been used to describe the sequence of nodes traversed by the jth restoration path, rather than including the matrix of values for all the $\delta_j^p$.

$C^{2,3}=20$, $C^{3,4}=90$, $C^{1,4}=20$, $C^{1,5}=50$, $C^{4,5}=70$, $C^{5,6}=120$, $C^{0,6}=50$, $C^{0,7}=50$, $C^{7,8}=120$, $C^{1,8}=50$, $C^{1,2}=0$, $C^{2,8}=20$, $C_{3,4}^{2,3}=20$, $C_{3,4}^{1,4}20$, $C_{4,5}^{3,5}=70$, $C_{5,6}^{4,5}=70$, $C_{5,6}^{1,5}=50$, $C_{5,6}^{0,6}=50$, $C_{0,7}^{0,6}=50$, $C_{7,8}^{0,7}=50$, $C_{1,8}^{1,4}=0$, $C_{1,8}^{1,5}=50$, $C_{7,8}^{1,8}=50$, $C_{2,3}^{1,2}=0$, $C_{1,4}^{1,2}=0$, $C_{1,5}^{1,2}=0$, $C_{2,8}^{2,3}=20$, $C_{7,8}^{2,8}=20$ $f^1=20$, $p^1=-6-7-1-2-3-0-4-5$, $f^2=50$, $p^2=6-7-1-0-4-5$, $f^3=50$, $p^3=0-4-5-6-7-1-2-3$, $f^4=20$, $p^4=0-1-2-3$

Two paths are used for each failure, span 0 uses paths 1 and 2, span 1 uses the 1-2-3-0 segment of path 1 and the 0-4-5-6-7-1 segment of path 3, and span 2 uses paths 3 and 4. In this particular case, 100% of the capacity required is preconfigured. That is, the network is in a state of complete readiness for any one of these three failures. The network is pre-configured by ensuring that each digital cross-connect switch connects the spans in the network according to the spare connections and cross-over connections that are output from the optimization engine.

The particular crosspoints which must be closed by the digital cross-connect switch at each node can also be determined directly from the flows $f^p$ output by the optimization engine. The spans making up the path followed by a given flow $f^p$ are those for which $\delta_j^p$ has the value 1.

First, the two terminal spans of the path are identified. Starting with either terminal span of the path, an unused spare link in the span is identified, and then an unused spare link in the next span is identified. The cross-point between the two spare links, which is at the first intermediate node in the path, is then operated to connect the unused spare links in the first and second spans of the path. Next, an unused spare link in the third span is identified and the crosspoint connecting the spare link in the second span to the spare link in the third span is operated at the digital cross-connect switch at the second intermediate node (between spans 2 and 3). This process continues until the second last node in the path, at which a crosspoint is operated between an unused spare link in the second last span to one in the last span.

Once all the nonzero flows in the preconfiguration solution have been processed in this manner, all the required crosspoints have been operated. The correctness of the operation can be double-checked at each crossconnect, by checking to make sure that the number of crosspoints actually operated between any two spans matches the number of spare connections, $C_{i,j}$, for that span pair, and also by checking to make sure that the number of crossover connections joining a sequence of three spans matches the number of crossover connections, $C_{k,m}^{i,j}$, as output by the optimizer.

A further example will now be described in relation to FIGS. 4–8.

Figure 4:
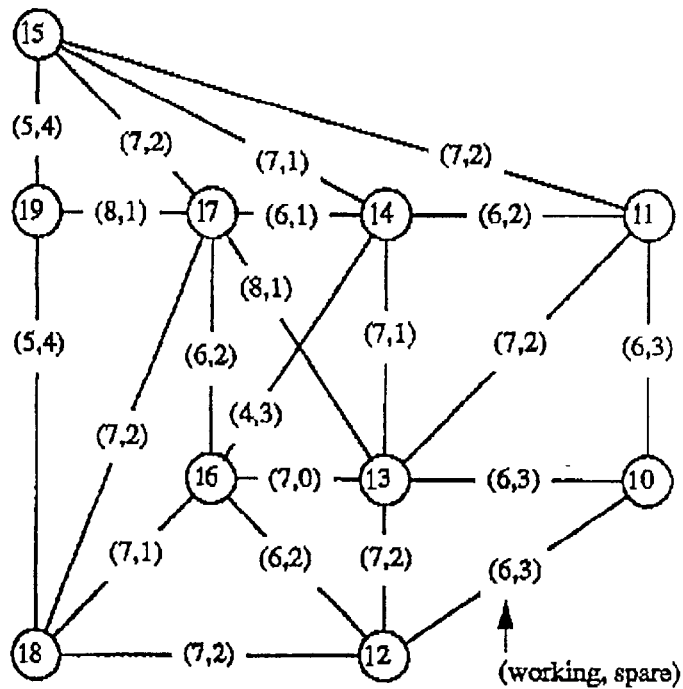
FIG. 4 is a diagram showing an exemplary network with 100% span restorability.
Figure 5:
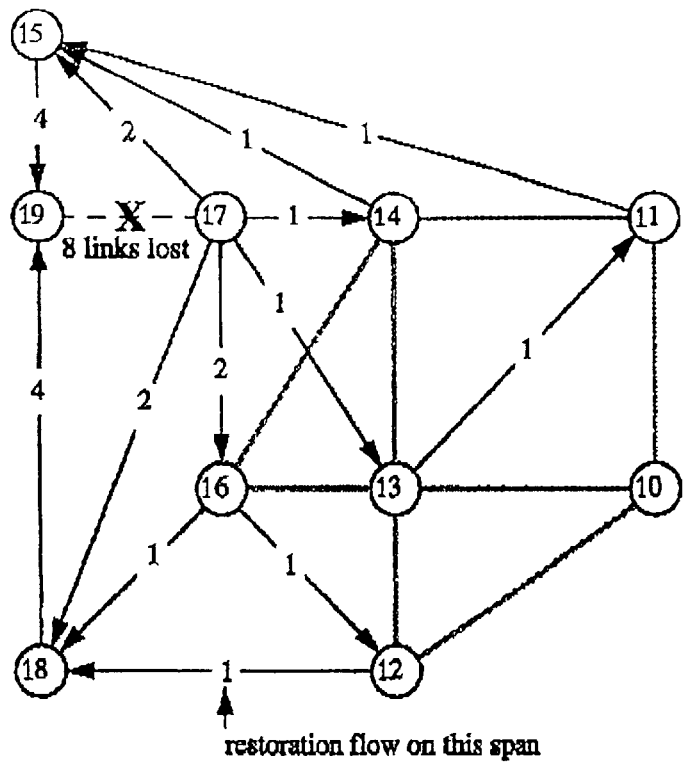
FIG. 5 is a diagram showing results of applying a real time restoration algorithm to the network of FIG. 4 upon the failure of span 7–9.
Figure 7:
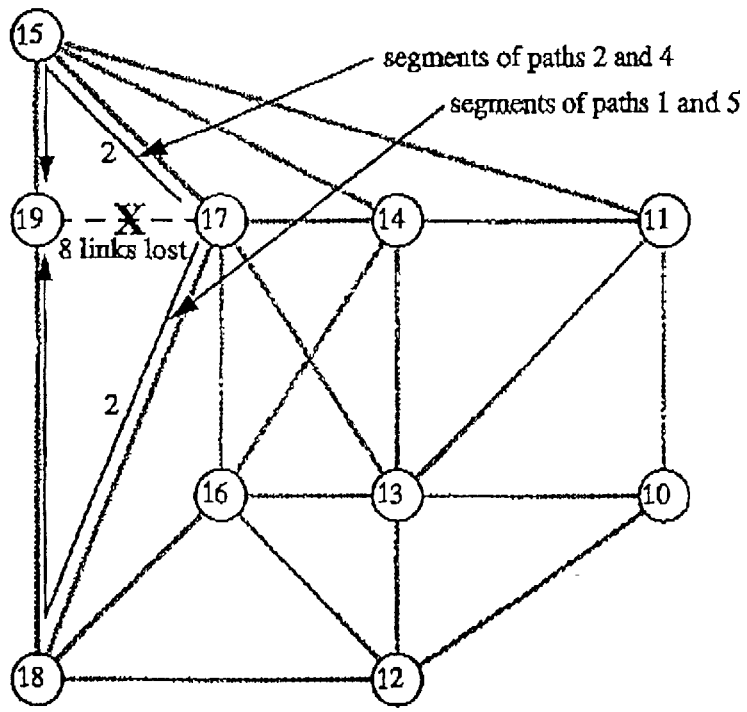
FIG. 7 is a diagram showing paths that are restorable using pre-configured restoration paths shown in FIG. 6 upon failure of span 7–9.
Figure 6:
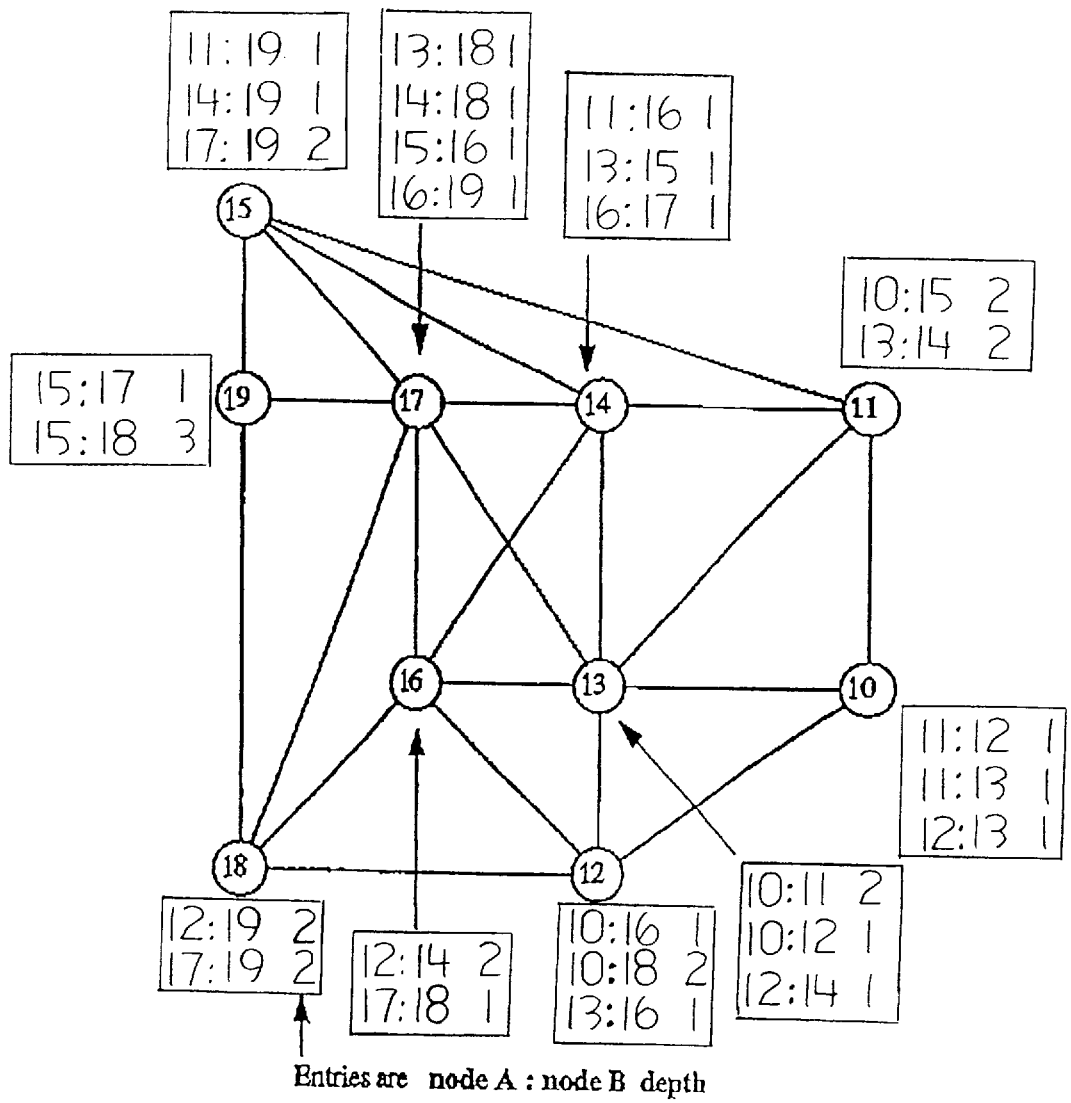
FIG. 6 is a diagram showing a pre-configuration plan for the network of FIG. 4.
Figure 8:
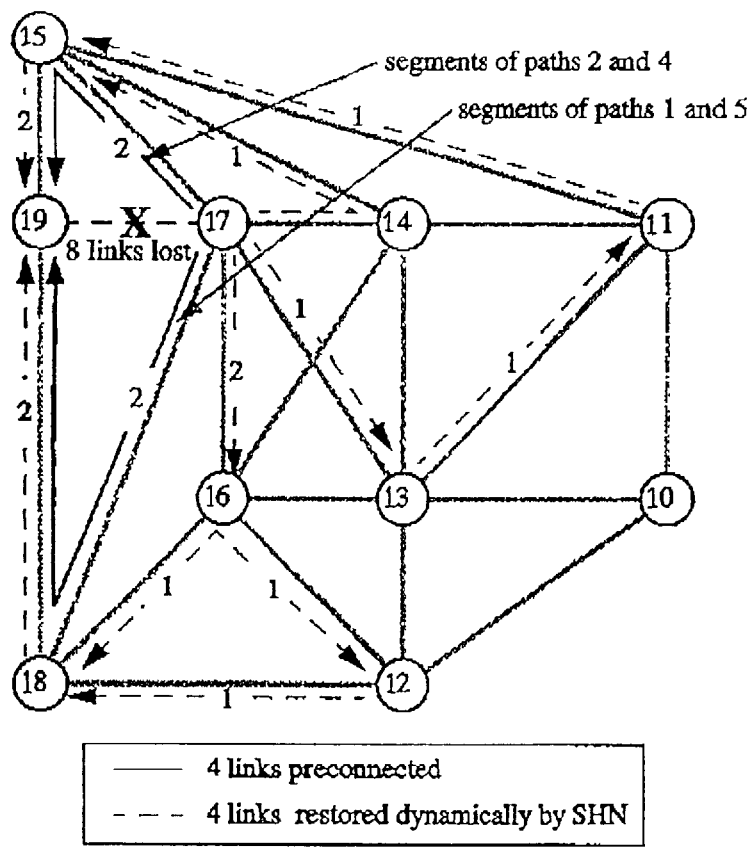
FIG. 8 is a diagram showing additional flow restored in the pre-configured network of FIG. 6 using a real time restoration process.

Referring to FIG. 4, there is shown a network having nodes 10, 11, 12, 13, 14, 15, 16, 17, 18 and 19. (n,m) on a given span indicates the working (n) and spare (m) capacity of the span. If span 17–19 fails, 8 working links are lost. The network shown in FIG. 4 is configured for 100% span restorability. A real time restoration algorithm for example according to the technique outlined in U.S. Pat. No. 4,956,835 issued Sept. 11, 1990, in the name of Wayne Grover will yield the restoration paths shown in FIG. 5. For rapid implementation of a restoration plan, however, according to the method of the invention, a pre-configuration plan is shown in FIG. 6 which specifies the restoration paths, and the cross-points pre-configured. The boxes associated with each node or digital cross-connect switch 10, 11, 12, 13, 14, 15, 16, 17, 18 and 19 indicates the respective nodes that are connected and the number of links made available for restoration flow. Thus, the digital cross-connect switch 12 is operated to join nodes 10 and 16 with one link, nodes 10 and 18 with two links and nodes 13 and 16 with one link. As shown in FIG. 8, upon the failure of span 17–19, four unit restoration paths are found fully pre-connected, while the remainder are restored dynamically by a real time restoration algorithm.

The objective function can be recalculated at time intervals corresponding approximately to the rate of change of the input constants. Thus, as network conditions change, the optimization tableau may be submitted to the optimization engine to update the preconfiguration of the network, either automatically at fixed time intervals or when needed or a mixture of both strategies.

A person skilled in the art could make immaterial modifications to the invention described in this patent without departing from the essence of the invention.

The embodiments of the invention in which an exclusive property of privilege is claimed are defined as follows:

1. A method for restoring traffic in a network in which the network includes plural distinct nodes interconnected by plural distinct spans, each span having working links and spare links, and having a span capacity, each node having a digital cross-connect switch for making and breaking connections between links in adjacent spans forming span paths through a node, the method comprising the steps of:

(1) for each of at least two possible span failures, (a) finding a number of restoration routes that are available in case of the occurrence of each span failure, (b) determining the resources used by each restoration route, and (c) determining the amount of flow to be restored for each span failure;

(2) finding, in a computer, the amount of flow $f^p$ to be restored along each restoration route that minimizes total unrestored flow for all possible span failures identified in step 1; and (3) forming connections at each digital crossconnect switch in the network along each restoration route before occurrence of one of the possible span failures identified in step 1 to permit the amount of flow $f^p$ determined in step 2 to be carried by each respective restoration route upon the occurrence of one of the possible span failures identified in step 1.

2. The method of claim 1 further including:

finding in a computer an assignment of connections between links in adjacent spans in the network that minimizes total unrestored flow for all possible span failures identified in step 1; and forming the connections at each digital cross-connect switch in the network by instructing each digital cross-connect switch in the network to make connections according to the assignment of connections.

3. The method of claim 1 in which finding, in a computer, the amount of flow $f^p$ to be restored along each restoration route includes:

forming a transformed network in which each span pair at a node is an edge in the transformed network and edges between adjacent nodes are cross-connected.

4. The method of claim 1 in which finding, in a computer, the amount of flow $f^p$ to be restored along each restoration route includes:

generating a first set of constraints relating the number of connections preconfigured for restoration between each two adjacent spans of the original network to the capacities of the two adjacent spans; and minimizing total unrestored flow for all possible span failures identified in step 1 subject to the first set of constraints.

5. The method of claim 1 in which finding, in a computer, the amount of flow $f^p$ to be restored along each restoration route includes:

generating a second set of constraints relating the amount of flow to be restored between each two adjacent spans of the original network to the number of spare links between the adjacent spans; and minimizing total unrestored flow for all possible span failures identified in step 1 subject to the second set of constraints.

6. The method of claim 1 in which finding, in a computer, the amount of flow $f^p$ to be restored along each restoration route includes:

generating a third set of constraints relating the amount of flow to be restored between three consecutive spans of the original network to the capacity of cross-connections between the consecutive spans; and minimizing total unrestored flow for all possible span failures identified in step 1 subject to the third set of constraints.

7. The method of claim 1 in which finding, in a computer, the amount of flow $f^p$ to be restored along each restoration route includes:

generating a fourth set of constraints relating the amount of flow used to restore a particular span failure to the number of working links on the particular span before failure; and minimizing total unrestored flow for all possible span failures identified in step 1 subject to the fourth set of constraints.

8. The method of claim 1 in which finding, in a computer, the amount of flow $f^p$ to be restored along each restoration route includes:

generating a fifth set of constraints relating the amount of flow on a particular span that cannot be restored upon the failure of that span to the number of working links on the particular span before failure; and minimizing total unrestored flow for all possible span failures identified in step 1 subject to the fifth set of constraints.

9. The method of claim 1 in which finding, in a computer, the amount of flow $f^p$ to be restored along each restoration route includes:

generating a sixth set of constraints relating the number of working links of a particular span before failure of that span to the restoration capacity of that span; and minimizing total unrestored flow for all possible span failures identified in step 1 subject to the sixth set of constraints.

10. The method of claim 1 further including, upon occurrence of a span failure, restoring capacity in the network according to a real-time restoration process.

11. The method of claim 1 in which forming the connections at each digital cross-connect switch in the network is carried out, for each restoration route, by:

identifying a starting node in the restoration route; and instructing the digital cross-connect switch at that node, and at each subsequent node in the network along the restoration route, to make connections determined by the restoration flow for that restoration route.

12. A method for restoring traffic in a network in which the network includes plural distinct nodes interconnected by plural distinct spans, each span having working links and spare links, and having a span capacity, each node having a digital cross-connect switch for making and breaking connections between adjacent spans forming span paths through a node, the method comprising the steps of:

(1) for each of at least two possible span failures, (a) finding the number of restoration routes available in case of the occurrence of each span failure, (b) determining the resources used by each restoration route, and (c) determining the amount of flow to be restored for each span failure;

(2) finding, in a computer, the amount of flow $f^p$ to be restored along each restoration route that minimizes spare capacity for all possible span failures identified in step 1; and (3) forming connections at each digital cross-connect switch in the network along each restoration route before occurrence of one of the possible span failures identified in step 1 to permit the amount of flow $f^p$ determined in step 2 to be carried by each respective restoration route upon the occurrence of one of the possible span failures identified in step 1.

* * * * *